(12) United States Patent
Zhang (10) Patent No.: US 12,483,062 B2
(45) Date of Patent: Nov. 25, 2025

(54) UNINTERRUPTIBLE POWER SUPPLY, UNINTERRUPTIBLE POWER SUPPLY CONTROL METHOD, RELATED APPARATUS, AND SYSTEM (71) Applicant: HUAWEI DIGITAL POWER TECHNOLOGIES CO., LTD., Shenzhen (CN)

(72) Inventor: Chuntao Zhang, Dongguan (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/635,736

(22) Filed: Apr. 15, 2024

(65) Prior Publication Data
US 2024/0388125 A1 Nov. 21, 2024

(30) Foreign Application Priority Data
May 15, 2023 (CN) .......................... 202310544404.6

(51) Int. Cl.
H02J 7/00 (2006.01)
H02J 9/06 (2006.01)

(52) U.S. Cl.
CPC ............ *H02J 9/062* (2013.01); *H02J 7/0013* (2013.01); *H02J 7/0048* (2020.01); *H02J 7/0049* (2020.01); *H02J 7/0063* (2013.01); *H02J 9/068* (2020.01)

(58) Field of Classification Search
CPC ...... H02J 7/0048; H02J 7/0049; H02J 7/0063; H02J 9/005; H02J 9/04; H02J 9/06; H02J 9/061; H02J 9/062; H02J 9/068
See application file for complete search history.

(56) References Cited

U.S. PATENT DOCUMENTS

| 2010/0244571 A1* | 9/2010 | Spitaels | H02J 3/144 307/80 |
| 2011/0148195 A1* | 6/2011 | Lee | H02J 7/35 307/25 |
| 2011/0148205 A1* | 6/2011 | Moon | H02J 9/062 307/65 |
| 2011/0208370 A1* | 8/2011 | Lee | G06F 1/30 700/297 |

(Continued)

FOREIGN PATENT DOCUMENTS

CN 115776170 A 3/2023

OTHER PUBLICATIONS

Extended European Search Report in European Appln. No. 24171566.3, mailed on Oct. 1, 2024, 31 pages.

*Primary Examiner* — Levi Gannon
(74) *Attorney, Agent, or Firm* — Fish & Richardson P.C.

(57) ABSTRACT

This application provides an uninterruptible power supply (UPS), an uninterruptible power supply control method, a related apparatus, and a system. In one example, the UPS determines a target value of a SOC of a battery of the UPS; and controls, based on the determined target value, a rectifier circuit and a direct current-to-direct current circuit in the UPS to charge the battery to make the SOC of the battery equal to the target value, or controls, based on the determined target value, an inverter circuit and a direct current-to-direct current circuit in the UPS to discharge the battery to make the SOC of the battery equal to the target value.

10 Claims, 4 Drawing Sheets (56) References Cited

U.S. PATENT DOCUMENTS

| | | | | |
|---|---|---|---|---|
| 2012/0306274 | A1* | 12/2012 | Shetler, Jr. | H02J 9/062 307/64 |
| 2013/0154369 | A1* | 6/2013 | Kim | H02J 3/28 307/26 |
| 2013/0169064 | A1* | 7/2013 | Park | H02J 3/381 307/112 |
| 2015/0194707 | A1* | 7/2015 | Park | H01M 10/425 429/61 |
| 2015/0333554 | A1* | 11/2015 | Cohen | H02J 7/00 324/426 |
| 2017/0093187 | A1* | 3/2017 | Park | H02J 3/381 |
| 2017/0093207 | A1* | 3/2017 | Park | H02J 9/061 |
| 2019/0280520 | A1* | 9/2019 | Zhang | H02J 9/005 |
| 2021/0336475 | A1* | 10/2021 | Navarro | H02J 9/062 |

* cited by examiner

UNINTERRUPTIBLE POWER SUPPLY, UNINTERRUPTIBLE POWER SUPPLY CONTROL METHOD, RELATED APPARATUS, AND SYSTEM

CROSS-REFERENCE TO RELATED APPLICATION

This application claims priority to Chinese Patent Application No. 202310544404.6, filed on May 15, 2023, which is hereby incorporated by reference in its entirety.

TECHNICAL FIELD

This application relates to the field of power technologies, and in particular, to an uninterruptible power supply, an uninterruptible power supply control method, a related apparatus, and a system.

BACKGROUND

When a power supply system supplies power to a load, a power supply exception often occurs. As a result, the load cannot obtain stable and continuous electric energy, and normal operation of the load is affected.

More power supply systems are provided with uninterruptible power supplies (UPSs), and batteries are disposed in the UPSs, to ensure continuity and stability of power supplying for the load. When the power supply system supplies power normally, the UPS charges the battery. When the power supply system cannot supply power normally, the UPS controls the battery to supply power to the load, to ensure continuous and stable operation of the load.

However, in a conventional technology, a battery disposed in a UPS easily catches fire, resulting in a security problem and low security and reliability.

SUMMARY

This application provides an uninterruptible power supply, an uninterruptible power supply control method, a related apparatus, and a system, to reduce a security risk of a battery by flexibly adjusting a SOC (state of the battery), thereby reducing a security risk of a power supply system.

According to a first aspect, this application provides an uninterruptible power supply, including a control apparatus, a direct current-to-direct current circuit, a rectifier circuit, an inverter circuit, and a battery, where an input end of the uninterruptible power supply is connected to an input end of the rectifier circuit, an output end of the rectifier circuit is connected to an input end of the inverter circuit, an output end of the inverter circuit is connected to an output end of the uninterruptible power supply, one end of the direct current-to-direct current circuit is connected to the output end of the rectifier circuit and the input end of the inverter circuit, and the other end of the direct current-to-direct current circuit is connected to the battery; and the control apparatus is configured to: determine a target value of a state of charge SOC of the battery; and control, based on the target value, the rectifier circuit and the direct current-to-direct current circuit to charge the battery, or control, based on the target value, the inverter circuit and the direct current-to-direct current circuit to discharge the battery, so that the SOC of the battery is equal to the target value.

In this technical solution, the input end of the uninterruptible power supply (UPS) is configured to receive electric energy from a mains supply or a diesel generator, where the mains supply may be understood as a power grid; and the output end of the UPS is configured to supply power to a load. In an example, after the input end of the UPS receives the electric energy, the output end of the UPS may supply the power to the load through the rectifier circuit and the inverter circuit.

It should be noted that switching may be performed between the mains supply and the diesel generator by using an automatic transfer switch (ATS). For example, when the mains supply fails, the ATS is used to switch to the diesel generator, to supply power to the UPS. The battery of the UPS may supply power to the load in the process of switching from the mains supply to the diesel generator.

The rectifier circuit includes an alternating current/direct current (AC/DC) rectifier, configured to convert an alternating current into a direct current for output. The inverter circuit includes a direct current/alternating current (DC/AC) inverter, configured to convert a direct current into an alternating current for output. The direct current-to-direct current circuit includes a DC/DC converter, configured to charge or discharge the battery. The direct current-to-direct current circuit may also be understood as a charge/discharge circuit.

Optionally, the battery may be a built-in battery of the UPS or an external battery of the UPS.

The state of charge (SOC) of the battery is a percentage of remaining power of the battery to nominal capacity of the battery. When the SOC of the battery is 100%, it indicates that the battery is in a fully charged state, and in this case, electric energy in the battery is the nominal capacity of the battery. When the SOC of the battery is 0, it indicates that electric energy in the battery is 0.

Optionally, the UPS may further include a bypass circuit, where one end of the bypass circuit may be connected to the input end of the rectifier circuit, and the other end of the bypass circuit may be connected to the output end of the inverter circuit, to supply power to the load when the rectifier circuit and/or the inverter circuit are/is faulty.

In this technical solution, after determining the target value of the SOC of the battery, the control apparatus may control, based on the target value, the rectifier circuit and the direct current-to-direct current circuit to charge the battery. For example, the control apparatus may control the electric energy received by the input end of the UPS to charge the battery through the rectifier circuit and the direct current-to-direct current circuit. After determining the target value of the SOC of the battery, the control apparatus may alternatively control, based on the target value, the inverter circuit and the direct current-to-direct current circuit to discharge the battery. For example, the control apparatus may control the electric energy in the battery to be supplied to the load as power by the output end of the UPS through the direct current-to-direct current circuit and the inverter circuit.

It should be noted that, when the SOC of the battery is at the target value, the following condition needs to be met: The backup time of the UPS can ensure operation stability of the load in the process of switching between the mains supply and the diesel generator. The backup time of the UPS may also be understood as a backup time of the battery of the UPS.

In this technical solution, the control apparatus determines the target value of the SOC of the battery of the UPS, and dynamically adjusts the SOC of the battery based on the determined target value, so that the electric energy stored in the battery can be reduced while normal switching between the mains supply and the diesel generator and continuous and reliable power supplying for the load are ensured, and the battery does not need to keep being in the fully charged state. This improves security and reliability of the battery, prolongs a service life of the battery, and further improves use security of the UPS.

With reference to the first aspect, in a possible implementation, the target value is related to capacity of the battery, the target value is related to a target backup time, or the target value is related to load power of the uninterruptible power supply, and the target backup time is a backup time required by a load of the uninterruptible power supply.

In this implementation, the capacity of the battery may be understood as nominal capacity of the battery at delivery, the target backup time is a backup time required by the load of the UPS in a process of switching from the mains supply to the diesel generator, and the load power of the UPS may be understood as output power of the UPS.

Optionally, the target backup time may include a starting time of the diesel generator and a switching time of the ATS.

Optionally, the target backup time may be a backup time whose ratio to a sum of the starting time of the diesel generator and the switching time of the ATS meets a threshold range, and the threshold range may be determined according to an actual requirement.

Optionally, the target value of the SOC may be related to one or more of the capacity of the battery, the target backup time, and the load power of the UPS.

Optionally, the target value of the SOC may be negatively correlated with the capacity of the battery, the target value of the SOC may be positively correlated with the target backup time, and the target value of the SOC may be positively correlated with the load power of the UPS.

With reference to the first aspect, in a possible implementation, the control apparatus is specifically configured to: obtain the capacity of the battery, the target backup time, and the load power; determine a maximum backup time of the uninterruptible power supply based on the capacity of the battery and the load power; and determine the target value based on the maximum backup time of the uninterruptible power supply and the target backup time.

In this implementation, the maximum backup time of the UPS may be understood as power supply duration in which the battery of the UPS may supply electric energy to the load when the battery is in the fully charged state. The maximum backup time of the UPS is determined based on the capacity of the battery and the load power of the UPS. For example, the maximum backup time of the UPS may be proportional to a ratio of the capacity of the battery to the load power of the UPS, and this proportion may be set according to an actual requirement.

The target value of the SOC of the battery may be a percentage of the target backup time to the maximum backup time.

With reference to the first aspect, in a possible implementation, the control apparatus is specifically configured to: obtain the capacity of the battery, the target backup time, and the load power; determine, based on the load power and the target backup time, storage energy required by the battery; and determine the target value based on the storage energy and the capacity of the battery.

In this implementation, the storage energy required by the battery may be determined based on the load power of the UPS and the backup time. For example, the storage energy required by the battery may be proportional to a product of the load power of the UPS and the target backup time, and this proportion may be set according to an actual requirement.

The target value of the SOC of the battery may be a percentage of the backup power required by the battery to the capacity of the battery, and the capacity of the battery is nominal capacity or rated capacity of the battery.

With reference to the first aspect, in a possible implementation, the control apparatus is specifically configured to: when the SOC of the battery is greater than the target value, control the inverter circuit and the direct current-to-direct current circuit to discharge the battery; or when the SOC of the battery is less than the target value, control the rectifier circuit and the direct current-to-direct current circuit to charge the battery.

In this implementation, after the target value of the SOC of the battery is determined, the SOC of the battery may be adjusted by controlling the rectifier circuit, the inverter circuit, and the direct current-to-direct current circuit of the UPS. For example, when a current SOC of the battery is greater than the target value, the inverter circuit and the direct current-to-direct current circuit may be controlled to discharge the battery, or when a current SOC of the battery is less than the target value, the rectifier circuit and the direct current-to-direct current circuit may be controlled to charge the battery, so that the SOC of the battery is equal to the target value.

With reference to the first aspect, in a possible implementation, the battery is a lithium battery.

According to a second aspect, this application provides an uninterruptible power supply control method, including: determining a target value of a state of charge SOC of a battery of an uninterruptible power supply; and controlling, based on the target value, a rectifier circuit and a direct current-to-direct current circuit of the uninterruptible power supply to charge the battery, or controlling, based on the target value, an inverter circuit and a direct current-to-direct current circuit of the uninterruptible power supply to discharge the battery, so that the SOC of the battery is equal to the target value.

The method may be implemented by a control apparatus. The control apparatus may be a general control apparatus of a power supply system, or may be a control apparatus of the UPS. An independent control apparatus of the UPS may be disposed in a UPS cabinet. This is not limited in this application.

The rectifier circuit includes an alternating current/direct current (AC/DC) rectifier, configured to convert an alternating current into a direct current for output. The inverter circuit includes a direct current/alternating current (DC/AC) inverter, configured to convert a direct current into an alternating current for output. The direct current-to-direct current circuit includes a DC/DC converter, configured to charge or discharge the battery. The direct current-to-direct current circuit may also be understood as a charge/discharge circuit.

Optionally, the battery may be a built-in battery of the UPS or an external battery of the UPS.

The SOC of the battery is a percentage of remaining power of the battery to nominal capacity of the battery. When the SOC of the battery is 100%, it indicates that the battery is in a fully charged state, and in this case, electric energy in the battery is the nominal capacity of the battery. When the SOC of the battery is 0, it indicates that electric energy in the battery is 0.

In this technical solution, after determining the target value of the SOC of the battery, the control apparatus may control, based on the target value, the rectifier circuit and the direct current-to-direct current circuit to charge the battery. For example, the control apparatus may control the electric energy input to the UPS to charge the battery through the rectifier circuit and the direct current-to-direct current circuit. After determining the target value of the SOC of the battery, the control apparatus may alternatively control, based on the target value, the inverter circuit and the direct current-to-direct current circuit to discharge the battery. For example, the control apparatus may control the electric energy in the battery to be output to the load through the direct current-to-direct current circuit and the inverter circuit, to supply power to the load.

It should be noted that, when the SOC of the battery is at the target value, the following condition needs to be met: The backup time of the UPS can ensure operation stability of the load in the process of switching between the mains supply and the diesel generator. The backup time of the UPS may also be understood as a backup time of the battery of the UPS.

In this technical solution, the target value of the SOC of the battery of the UPS is determined, and the SOC is dynamically adjusted based on the determined target value, so that the battery does not need to keep being in the fully charged state. This improves security and reliability of the battery, and prolongs a service life of the battery.

With reference to the second aspect, in a possible implementation, the target value is related to capacity of the battery, the target value is related to a target backup time, or the target value is related to load power of the uninterruptible power supply, and the target backup time is a backup time required by a load of the uninterruptible power supply.

In this implementation, the capacity of the battery is nominal capacity of the battery at delivery, the target backup time is a backup time required by the load of the UPS in a process of switching from the mains supply to the diesel generator, and the load power of the UPS may be understood as output power of the UPS.

Optionally, the target backup time may include a starting time of the diesel generator and a switching time of an automatic transfer switch (ATS).

Optionally, the target backup time may be a backup time whose ratio to a sum of the starting time of the diesel generator and the switching time of the ATS meets a threshold range, and the threshold range may be determined according to an actual requirement.

Optionally, the target value of the SOC may be related to one or more of the capacity of the battery, the target backup time, and the load power of the UPS.

Optionally, the target value of the SOC may be negatively correlated with the capacity of the battery, the target value of the SOC may be positively correlated with the target backup time, and the target value of the SOC may be positively correlated with the load power of the UPS.

With reference to the second aspect, in a possible implementation, the determining a target value of a SOC of a battery of an uninterruptible power supply includes: obtaining the capacity of the battery, the target backup time, and the load power; determining a maximum backup time of the uninterruptible power supply based on the capacity of the battery and the load power; and determining the target value based on the maximum backup time of the uninterruptible power supply and the target backup time.

The maximum backup time of the UPS may be understood as power supply duration in which the battery of the UPS may supply electric energy to the load when the battery is in the fully charged state. The maximum backup time of the UPS is determined based on the capacity of the battery and the load power of the UPS. For example, the maximum backup time of the UPS may be proportional to a ratio of the capacity of the battery to the load power of the UPS, and this proportion may be set according to an actual requirement.

Optionally, the capacity of the battery may be configured in advance in the control apparatus, and the target backup time may also be configured in advance in the control apparatus.

Optionally, if the method is performed by a control apparatus other than the independent control apparatus of the UPS, the control apparatus may obtain the load power of the UPS from the UPS.

In this implementation, the target value of the SOC of the battery may be a percentage of the target backup time to the maximum backup time.

With reference to the second aspect, in a possible implementation, the determining a target value of a SOC of a battery of an uninterruptible power supply includes: obtaining the capacity of the battery, the target backup time, and the load power; determining, based on the load power and the target backup time, storage energy required by the battery; and determining the target value based on the storage energy and the capacity of the battery.

In this implementation, the storage energy required by the battery may be determined based on the load power of the UPS and the backup time. For example, the storage energy required by the battery may be proportional to a product of the load power of the UPS and the target backup time, and this proportion may be set according to an actual requirement.

The target value of the SOC of the battery may be a percentage of the backup power required by the battery to the capacity of the battery, and the capacity of the battery is nominal capacity or rated capacity of the battery.

With reference to the second aspect, in a possible implementation, the controlling, based on the target value, a rectifier circuit and a direct current-to-direct current circuit of the uninterruptible power supply to charge the battery, or controlling, based on the target value, an inverter circuit and a direct current-to-direct current circuit of the uninterruptible power supply to discharge the battery, so that the SOC of the battery is equal to the target value includes: when the SOC of the battery is greater than the target value, controlling the inverter circuit and the direct current-to-direct current circuit of the uninterruptible power supply to discharge the battery; or when the SOC of the battery is less than the target value, controlling the rectifier circuit and the direct current-to-direct current circuit of the uninterruptible power supply to charge the battery.

In this implementation, after the target value of the SOC of the battery is determined, the SOC of the battery may be adjusted by controlling the rectifier circuit, the inverter circuit, and the direct current-to-direct current circuit of the UPS. For example, when a current SOC of the battery is greater than the target value, the inverter circuit and the direct current-to-direct current circuit may be controlled to discharge the battery, or when a current SOC of the battery is less than the target value, the rectifier circuit and the direct current-to-direct current circuit may be controlled to charge the battery, so that the SOC of the battery is equal to the target value.

With reference to the second aspect, in a possible implementation, the battery is a lithium battery.

According to a third aspect, this application provides a control apparatus. The apparatus includes modules configured to implement the method in any one of the second aspect or implementations of the second aspect, and each module may be implemented in a form of hardware and/or software.

For example, the apparatus may include a processing module. The processing module is configured to: determine a target value of a state of charge SOC of a battery of an uninterruptible power supply; and the processing module is configured to: control, based on the target value, a rectifier circuit and a direct current-to-direct current circuit of the uninterruptible power supply to charge the battery, or control, based on the target value, an inverter circuit and a direct current-to-direct current circuit of the uninterruptible power supply to discharge the battery, so that the SOC of the battery is equal to the target value.

With reference to the third aspect, in a possible implementation, the control apparatus may further include a transceiver module. The transceiver module is configured to obtain capacity of the battery, a target backup time, and load power; the processing module is further configured to determine a maximum backup time of the uninterruptible power supply based on the capacity of the battery and the load power; and the processing module is further configured to determine the target value based on the maximum backup time of the uninterruptible power supply and the target backup time.

With reference to the third aspect, in a possible implementation, the transceiver module is further configured to obtain capacity of the battery, a target backup time, and a load power; the processing module is further configured to determine, based on the load power and the target backup time, storage energy required by the battery; and the processing module is further configured to determine the target value based on the storage energy and the capacity of the battery.

With reference to the third aspect, in a possible implementation, the processing module is further configured to: when the SOC of the battery is greater than the target value, control the inverter circuit and the direct current-to-direct current circuit of the uninterruptible power supply to discharge the battery; or the processing module is further configured to: when the SOC of the battery is less than the target value, control the rectifier circuit and the direct current-to-direct current circuit of the uninterruptible power supply to charge the battery.

According to a fourth aspect, this application provides a control apparatus, including a processor. The processor may be coupled to a memory, and is configured to invoke program code in the memory, to implement the method in any one of the second aspect or the possible implementations of the second aspect. Optionally, the apparatus further includes the memory.

Optionally, the apparatus further includes a communication interface, and the processor is coupled to the communication interface.

According to a fifth aspect, this application provides a power supply system, including the uninterruptible power supply in the first aspect.

According to a sixth aspect, this application provides a computer-readable medium. The computer-readable medium stores program code to be executed by a device, and the program code is used to perform the method in any one of the second aspect or the possible implementations of the second aspect.

According to a seventh aspect, this application provides a computer program product including instructions. When the computer program product runs on a computer, the computer is enabled to perform the method in any one of the second aspect or the possible implementations of the second aspect.

The foregoing accompanying drawings show specific embodiments of this application, and more detailed descriptions are provided below. The accompanying drawings and text descriptions are not intended to limit the scope of the idea of this application in any manner, but are intended to describe the concept of this application to a person skilled in the art with reference to particular embodiments.

DESCRIPTION OF EMBODIMENTS

Example embodiments are described in detail herein, and examples of the example embodiments are presented in accompanying drawings. When the following description relates to the accompanying drawings, unless specified otherwise, same numbers in different accompanying drawings represent a same or similar element. Implementations described in the following example embodiments do not represent all implementations consistent with this application. On the contrary, the implementations are merely examples of apparatuses and methods that are described in the appended claims in detail and that are consistent with some aspects of this application.

When a power supply system supplies power to a load, the power supply system may be provided with an uninterruptible power supply (UPS), and a battery is disposed in the UPS, to ensure continuity and stability of power supplying. When the power supply system operates normally, the UPS charges the battery. When the power supply system is faulty, the UPS may control the battery to be discharged and continue to supply the load with electric energy output by the battery as power, to ensure continuous and stable operation of the load.

The technical solutions provided in this application may be applied to a power supply and distribution system of a data center, or may be applied to another power supply system. This is not limited in this application.

Figure 1:
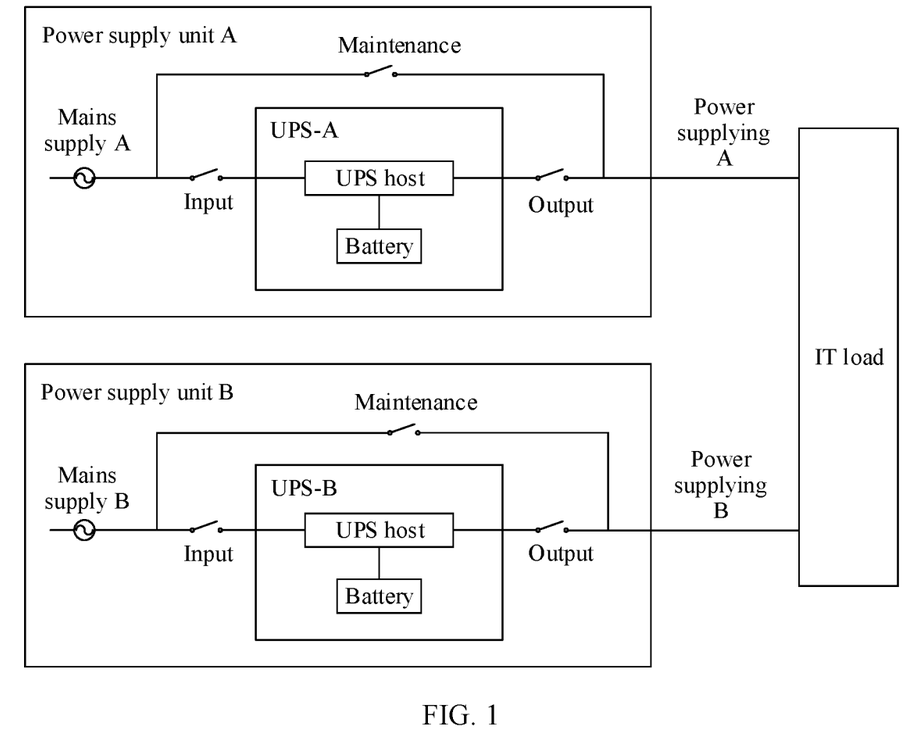
FIG. 1 is a schematic diagram of an application scenario according to an embodiment of this application.

In an example, FIG. 1 is a schematic diagram of an application scenario according to an embodiment of this application. As shown in FIG. 1, the application scenario is a UPS power supply system that is of a data center and that uses a 2N architecture. The power supply system is configured to supply electric energy to an IT load.

The 2N architecture means that two sets of totally independent power supply units (for example, a power supply unit A and a power supply unit B shown in FIG. 1) are used, each set of power supply unit can meet a power consumption requirement of the IT load, and the two sets of power supply units operate independently and back up each other.

The IT load is a server load, for example, workloads that an organization or enterprise information technology system needs to bear, such as a computation amount, storage capacity, and network traffic of a computer system. For ease of description, the IT load is briefly referred to as a load below.

As shown in FIG. 1, the power supply unit A includes a mains supply A, a UPS-A, and related accessories (for example, an input, an output, and a maintenance switch), and the power supply unit B includes a mains supply B, a UPS-B, and related accessories (for example, an input, an output, and a maintenance switch).

It should be noted that a mains supply (for example, the mains supply A or the mains supply B) may be from a power grid.

The UPS (for example, the UPS-A or the UPS-B) may include a UPS host and a battery. The UPS host may include a rectifier, an inverter, and other devices.

Optionally, the battery may be a built-in battery of the UPS or an external battery of the UPS.

As shown in FIG. 1, when the power supply system operates normally, the mains supply A of the power supply unit A and the mains supply B of the power supply unit B supply electric energy to the load. For example, the mains supply A is used as an alternating current input of the UPS-A, electric energy output by the mains supply A may supply power to the load through the UPS-A, and the electric energy output by the mains supply A may also charge the battery of the UPS-A. Correspondingly, the mains supply B is used as an alternating current input of the UPS-B, electric energy output by the mains supply B may supply power to the load through the UPS-B, and the electric energy output by the mains supply B may also charge the battery of the UPS-B. Output power of the mains supply A and the mains supply B is 50% of load power.

If a mains supply (power grid) of one set of power supply unit of the power supply system is faulty, the power supply system uses an automatic transfer switch (ATS) to switch between the mains supply and a diesel generator, so that the diesel generator can supply power to the load as an alternating current input of the UPS (for example, the UPS-A or the UPS-B). This can ensure stable operation of the load. The ATS is a switch that automatically switches a load from one power supply to another (standby) power supply to ensure continuous and reliable operation of an important load.

However, a switching process usually takes a specific time (for example, 1 to 3 minutes), for example, the time includes a starting time of the diesel generator and a switching time of the ATS. In the switching process, a battery that is of the UPS (for example, the UPS-A or the UPS-B) and that has stored electric energy may supply power. For example, when the mains supply (power grid) of the power supply unit A is faulty, the battery of the UPS-A may supply power to the load. The output power of the battery of the UPS-A needs to be the same as the output power of the mains supply A.

The electric energy stored in the battery may be represented by a state of charge (SOC) of the battery, and the SOC of the battery is a percentage of remaining power of the battery to nominal capacity of the battery. When the SOC of the battery is 100%, it indicates that the battery is in a fully charged state, and in this case, the electric energy in the battery is the nominal capacity of the battery; when the SOC of the battery is 50%, it indicates that the electric energy in the battery is half of the nominal capacity; or when the SOC of the battery is 10%, it indicates that the electric energy in the battery is one tenth of the nominal capacity.

In an actual application, a backup time of the UPS needs to be greater than or equal to a time for switching between the mains supply and the diesel generator, to ensure continuous and stable operation of the load. In addition, there may be a poor working condition of full-load operation of the UPS in the power supply system, and consequently, the battery in the conventional technology keeps being in the fully charged state. Full-load operation of the UPS means that load power of the UPS is equal to rated power of the UPS. The load power of the UPS may be understood as output power of the UPS. The backup time of the UPS may be understood as power supply duration in which the battery of the UPS may supply electric energy to the load after the mains supply is cut off. The backup time of the UPS is related to the electric energy stored in the battery and the load power of the UPS. For example, the backup time of the UPS may be in direct proportion to the electric energy stored in the battery, and may be in inverse proportion to the load power of the UPS.

However, engineering personnel find that the SOC state of the battery is closely related to security of the battery, and a larger SOC of the battery indicates a higher security risk. Therefore, when the battery is in the fully charged state for a long time, the battery easily catches fire, resulting in a security problem and low security and reliability of the battery. In addition, when the SOC of the battery is configured based on the poor working condition of full-load operation of the UPS, the backup time of the UPS is excessively long when the load power of the UPS is low, resulting in a waste of resources.

In view of this, this application provides an uninterruptible power supply, an uninterruptible power supply control method, a related apparatus, and a system, to reduce a security risk of a battery by flexibly adjusting a SOC state of the battery, thereby reducing a security risk of a power supply system.

Figure 2:
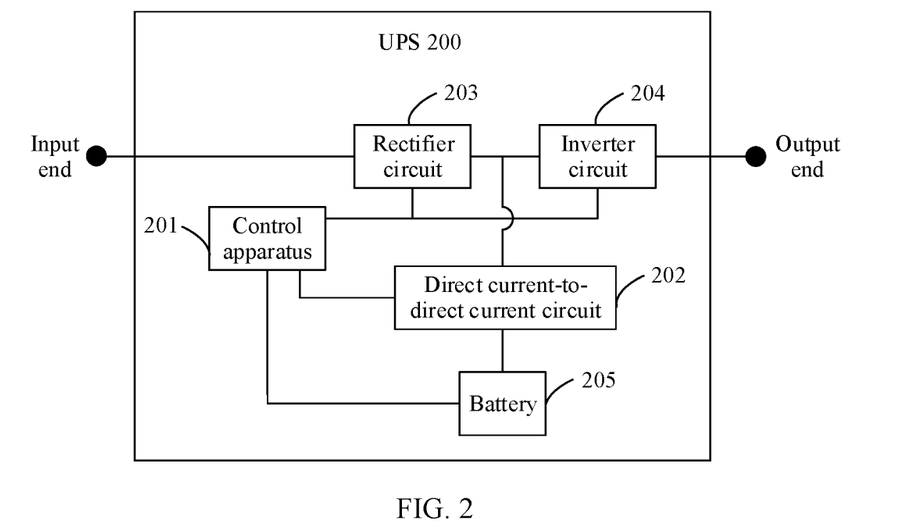
FIG. 2 is a diagram of an example structure of a UPS according to an embodiment of this application.

FIG. 2 is a diagram of an example structure of a UPS according to an embodiment of this application. As shown in FIG. 2, the UPS 200 may include a control apparatus 201, a direct current-to-direct current circuit 202, a rectifier circuit 203, an inverter circuit 204, and a battery 205.

As shown in FIG. 2, an input end of the UPS 200 is connected to an input end of the rectifier circuit 203, an output end of the rectifier circuit 203 is connected to an input end of the inverter circuit 204, an output end of the inverter circuit 204 is connected to an output end of the UPS 200, one end of the direct current-to-direct current circuit 202 is connected to the output end of the rectifier circuit 203 and the input end of the inverter circuit 204, and the other end of the direct current-to-direct current circuit 202 is connected to the battery 205.

The input end of the UPS 200 is configured to receive electric energy from a mains supply or a diesel generator, and the output end of the UPS 200 is configured to supply power to a load. In an example, after the input end of the UPS 200 receives the electric energy, the output end of the UPS 200 may supply the power to the load through the rectifier circuit 203 and the inverter circuit 204.

In this embodiment, the rectifier circuit 203 may include an alternating current/direct current (AC/DC) rectifier, configured to convert an alternating current into a direct current for output. The inverter circuit 204 may include a direct current/alternating current (DC/AC) inverter, configured to convert a direct current into an alternating current for output. The direct current-to-direct current circuit 202 may include a DC/DC converter, configured to charge or discharge the battery 205. The direct current-to-direct current circuit 202 may also be understood as a charge/discharge circuit.

The control apparatus 201 is configured to: determine a target value of a state of charge SOC of the battery 205, and control, based on the target value, the rectifier circuit 203 and the direct current-to-direct current circuit 202 to charge the battery 205. For example, the control apparatus 201 may control the electric energy received by the input end of the UPS 200 to charge the battery 205 through the rectifier circuit 203 and the direct current-to-direct current circuit 202. The control apparatus 201 may be further configured to control, based on the target value, the inverter circuit 204 and the direct current-to-direct current circuit 202 to discharge the battery 205. For example, the control apparatus 201 may control electric energy in the battery 205 to be supplied to the load as power by the output end of the UPS 200 through the direct current-to-direct current circuit 202 and the inverter circuit 204.

In this embodiment, when the SOC of the battery 205 is at the target value, a backup time of the UPS 200 needs to ensure operation stability of the load in a process of switching between the mains supply and the diesel generator.

For example, when the SOC of the battery is at the target value, the following condition may be met: The backup time of the UPS is proportional to a target backup time. A ratio may be set according to an actual requirement, for example, the ratio may be 1.

The target backup time is a power supply time required by the load of the UPS in a process of switching from the mains supply to the diesel generator. The target backup time may also be understood as a backup time whose ratio to a sum of a starting time of the diesel generator and a switching time of an ATS meets a threshold range.

In this embodiment, optionally, the battery 205 may be a built-in battery of the UPS 200, and is disposed in a UPS cabinet together with the control apparatus 201, the direct current-to-direct current circuit 202, the rectifier circuit 203, and the inverter circuit 204; or the battery 205 may be an external battery of the UPS 200, and is independently disposed in an independent battery cabinet. This is not limited in this application.

Optionally, the battery 205 may be a lithium battery.

Figure 3:
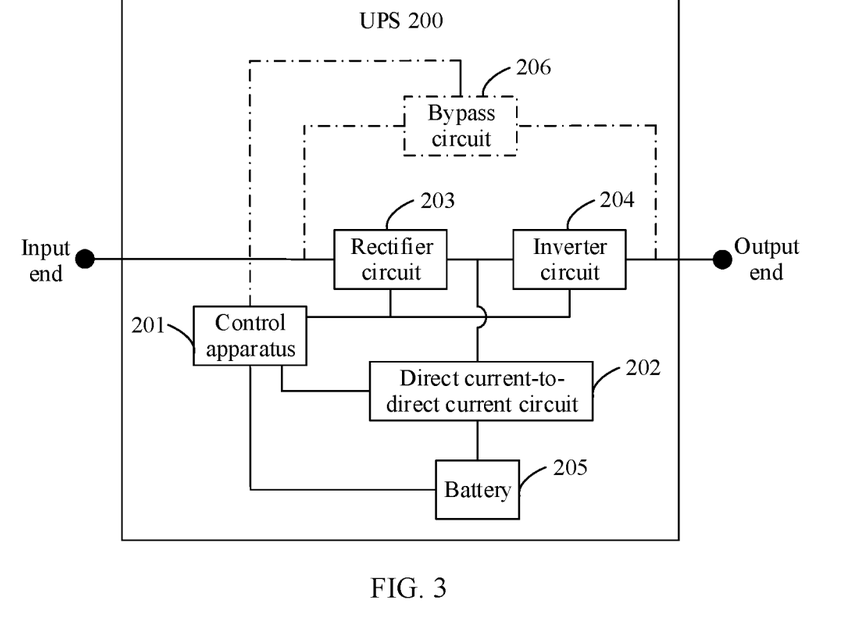
FIG. 3 shows an example structure of a UPS according to another embodiment of this application.

FIG. 3 is a diagram of an example structure of a UPS according to another embodiment of this application. As shown by dashed lines in FIG. 3, the UPS 200 may further include a bypass circuit 206. One end of the bypass circuit 206 may be connected to the input end of the rectifier circuit 203, and the other end of the bypass circuit 206 may be connected to the output end of the inverter circuit 204, to supply power to the load when the rectifier circuit 203 and/or the inverter circuit 204 are/is faulty. For example, if the rectifier circuit 203 and/or the inverter circuit 204 are/is faulty, electric energy received by the input end of the UPS 200 may be supplied to the load as power by the output end of the UPS 200 through the bypass circuit 206.

Figure 4:
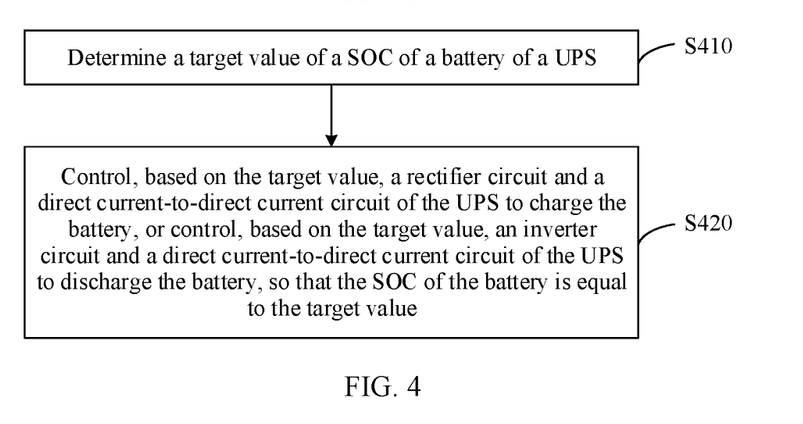
FIG. 4 is a schematic flowchart of a UPS control method according to an embodiment of this application.

FIG. 4 is a schematic flowchart of a UPS control method according to an embodiment of this application. As shown in FIG. 4, the method includes S410 and S420.

The method may be implemented by a control apparatus of a UPS.

In this embodiment, the control apparatus may perform the method shown in FIG. 4 in a preconfigured period.

S410: Determine a target value of a SOC of a battery of the UPS.

In a possible implementation, the target value of the SOC of the battery may be related to capacity of the battery, the target value may be related to a target backup time, or the target value may be related to load power of the uninterruptible power supply.

The capacity of the battery is nominal capacity of the battery at delivery, and the load power of the UPS may be understood as output power of the UPS.

In this implementation, optionally, the target value of the SOC may be related to only one of the capacity of the battery, the target backup time, and the load power of the UPS.

In an example, the target value of the SOC may be related to only the load power of the UPS, and the target value of the SOC may be positively correlated with the load power of the UPS. For example, when the capacity of the battery is set to 70 kWh, the target backup time is set to 10 minutes, and a load rate of the UPS is 100%, the target value of the SOC of the battery is 100%; when a load rate of the UPS is 50%, the target value of the SOC may be 50%; or when a load rate of the UPS is 25%, the target value of the SOC may be 25%. The load rate of the UPS is a percentage of the load power of the UPS to rated power of the UPS.

In an example, the target value of the SOC may be related to only the capacity of the battery, and the target value of the SOC may be negatively correlated with the capacity of the battery.

In an example, the target value of the SOC may be related to only the target backup time, and the target value of the SOC may be positively correlated with the target backup time.

Optionally, the target value of the SOC may be related to a plurality of items of the capacity of the battery, the target backup time, and the load power of the UPS.

In an example, the target value of the SOC of the battery may be determined in the following manner: determining a maximum backup time of the UPS based on the capacity of the battery and the load power of the UPS; and determining the target value based on the maximum backup time of the UPS and the target backup time.

The maximum backup time of the UPS may be understood as power supply duration in which the battery of the UPS may supply electric energy to a load when the battery is in a fully charged state. The maximum backup time of the UPS is determined based on the capacity of the battery and the load power of the UPS. For example, the maximum backup time of the UPS may be proportional to a ratio of the capacity of the battery to the load power of the UPS, and this proportion may be set according to an actual requirement.

In this example, the target value of the SOC of the battery may be a percentage of the target backup time to the maximum backup time.

In an example, the target value of the SOC of the battery may be further determined in the following manner: determining, based on the load power of the UPS and the target backup time, storage energy required by the battery; and determining the target value based on the storage energy required by the battery and the capacity of the battery.

The storage energy required by the battery may be determined based on the load power of the UPS and the backup time. For example, the storage energy required by the battery may be proportional to a product of the load power of the UPS and the target backup time, and this proportion may be set according to an actual requirement.

In this example, the target value of the SOC of the battery may be a percentage of the backup power required by the battery to the capacity of the battery, and the capacity of the battery is nominal capacity or rated capacity of the battery.

In an example, the target value of the SOC may alternatively be determined according to the following relational expression:

$$SOC_{target\ value} = K_1 * K_2 * 100\%$$

$K_1$ is a coefficient related to the load power, and $K_2$ is a coefficient related to the backup time.

Optionally, $K_1$ may be a ratio of the load power of the UPS to the rated power of the UPS, and $K_2$ may be a ratio of the target backup time of the UPS to the maximum backup time of the UPS.

It should be noted that a specific implementation of determining the target value of the SOC is not limited in this application. For example, the target value of the SOC may also be related to a temperature and humidity of an environment of the battery.

S420: Control, based on the target value, a rectifier circuit and a direct current-to-direct current circuit of the UPS to charge the battery, or control, based on the target value, an inverter circuit and a direct current-to-direct current circuit of the UPS to discharge the battery, so that the SOC of the battery is equal to the target value.

In this embodiment, after determining the target value of the SOC of the battery, the control apparatus may adjust the SOC of the battery by controlling the rectifier circuit, the inverter circuit, and the direct current-to-direct current circuit of the UPS. For example, when a current SOC of the battery is greater than the target value, the inverter circuit and the direct current-to-direct current circuit may be controlled to discharge the battery, or when a current SOC of the battery is less than the target value, the rectifier circuit and the direct current-to-direct current circuit may be controlled to charge the battery, so that the SOC of the battery is equal to the target value.

Optionally, if the battery has an independent control apparatus, when performing the method, the control apparatus of the UPS may further send a charge/discharge instruction to the independent control apparatus of the battery, to instruct the independent control apparatus of the battery to control the rectifier circuit, the inverter circuit, and the direct current-to-direct current circuit to adjust the SOC of the battery.

In this technical solution provided in this application, the target value of the SOC of the battery of the UPS is determined, and the SOC is dynamically adjusted based on the determined target value, so that electric energy stored in the battery is reduced while the target backup time is met. This can ensure operation stability of the load, improve security and reliability of the battery, and prolong a service life of the battery.

Figure 5:
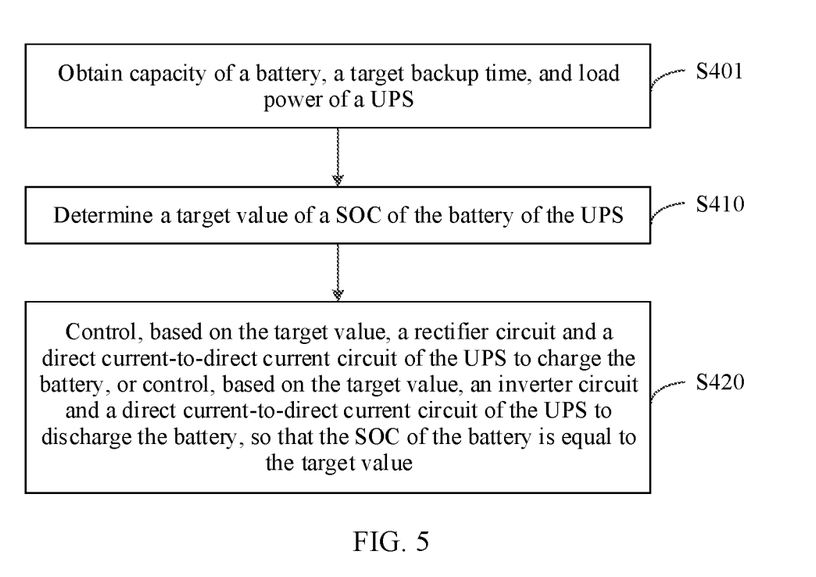
FIG. 5 is a schematic flowchart of a UPS control method according to another embodiment of this application.

FIG. 5 is a schematic flowchart of a UPS control method according to another embodiment of this application. The method shown in FIG. 5 may include S410 and S420, and may further include S401.

The method may be implemented by a control apparatus of a UPS.

S401: Obtain capacity of a battery, a target backup time, and load power of the UPS.

Optionally, the capacity of the battery and the target backup time may be configured in advance in the control apparatus, and the control apparatus may invoke this information.

Optionally, the control apparatus may obtain the load power of the UPS based on obtained output voltage and output current of the UPS.

In this embodiment, the control apparatus may perform the method shown in FIG. 5 in a preconfigured period.

Figure 6:
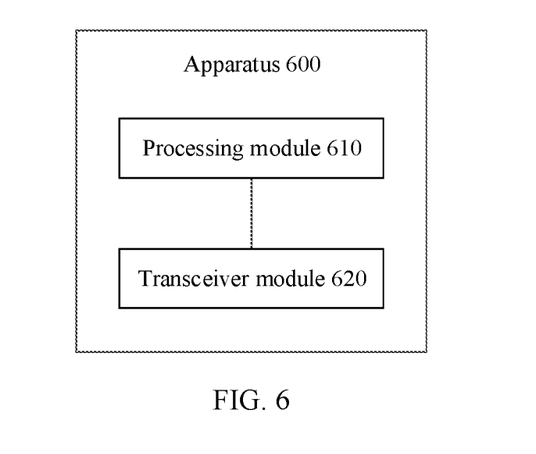
FIG. 6 is a schematic diagram of a structure of a control apparatus according to an embodiment of this application.

FIG. 6 is a schematic diagram of a structure of a control apparatus according to an embodiment of this application. The apparatus 600 shown in FIG. 6 may be configured to implement the steps in FIG. 4 or FIG. 5. As shown in FIG. 6, the apparatus 600 in this embodiment may include a processing module 610 and a transceiver module 620.

When the apparatus 600 is configured to implement the method shown in FIG. 4, the processing module 610 may be configured to implement S410 and S420.

When the apparatus 600 is configured to implement the method shown in FIG. 5, the processing module 610 may be configured to implement S410 and S420, and the transceiver module 620 may be configured to implement S401.

It should be understood that the apparatus 600 is represented in a form of a functional module. The term "module" may be an application-specific integrated circuit (ASIC), an electronic circuit, a processor (for example, a shared processor, a dedicated processor, or a group processor) configured to execute one or more software or firmware programs, a memory, a merged logic circuit, and/or another suitable component that supports the described function. In an optional example, a person skilled in the art may understand that the apparatus 600 may be specifically the control apparatus in the foregoing method embodiments, or functions of the control apparatus in the foregoing method embodiments may be integrated into the apparatus 600. The apparatus 600 may be configured to perform procedures and/or steps corresponding to the control apparatus in the foregoing method embodiments. To avoid repetition, details are not described herein again.

Figure 7:
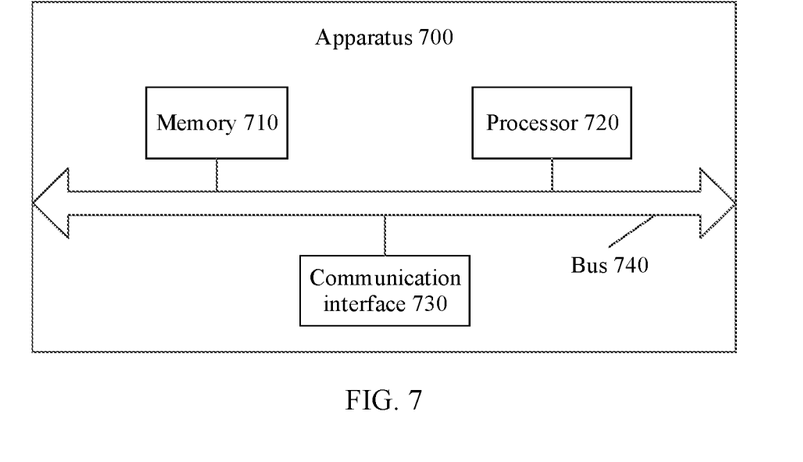
FIG. 7 is a schematic diagram of a structure of a control apparatus according to another embodiment of this application.

FIG. 7 is a schematic diagram of a structure of a control apparatus according to another embodiment of this application. The apparatus 700 shown in FIG. 7 may be configured to implement the method performed by the control apparatus in any one of the foregoing embodiments.

As shown in FIG. 7, the apparatus 700 provided in this embodiment includes a memory 710, a processor 720, a communication interface 730, and a bus 770. The memory 710, the processor 720, and the communication interface 730 are communicatively connected to each other through the bus 770.

The memory 710 may be a read-only memory (ROM), a static storage device, a dynamic storage device, or a random access memory (RAM). The memory 710 may store a program. When the program stored in the memory 710 is executed by the processor 720, the processor 720 is configured to perform steps that are of the method shown in FIG. 4 or FIG. 5 and that are performed by the control apparatus.

The processor 720 may be a general-purpose central processing unit (CPU), a microprocessor, an application-specific integrated circuit (ASIC), or one or more integrated circuits, to execute a related program.

Alternatively, the processor 720 may be an integrated circuit chip, and has a signal processing capability. In an implementation process, the related steps in embodiments of this application may be completed by using a hardware integrated logic circuit in the processor 720 or instructions in a form of software.

The processor 720 may alternatively be a general-purpose processor, a digital signal processor (DSP), an application-specific integrated circuit (ASIC), a field-programmable gate array (FPGA) or another programmable logic device, a discrete gate or transistor logic device, or a discrete hardware component. The processor may implement or perform the methods, the steps, and the logical block diagrams that are disclosed in embodiments of this application. The general-purpose processor may be a microprocessor, or the processor may be any conventional processor or the like.

The steps of the methods disclosed with reference to embodiments of this application may be directly performed and completed by a hardware decoding processor, or may be performed and completed by a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory 710. The processor 720 reads information in the memory 710, and completes, in combination with hardware of the processor, functions that need to be performed by the units included in the apparatuses in this application.

The communication interface 730 may use a transceiver apparatus, for example, but not limited to, a transceiver, to implement communication between the apparatus 700 and another device or apparatus.

The bus 770 may include a path for information transfer between various components (for example, the memory 710, the processor 720, and the communication interface 730) of the apparatus 700.

Some embodiments of this application further provide a computer program product. For example, when a SOC of a battery is adjusted, the method implemented by the control apparatus in any one of the foregoing embodiments may be implemented when the computer program product runs on a processor. Some embodiments of this application further provide a computer-readable storage medium. The computer-readable storage medium includes computer instructions. When the computer instructions are run on a processor, the method implemented by the control apparatus in any one of the foregoing embodiments may be implemented.

It should be noted that the foregoing modules or components shown in the foregoing embodiments may be configured as one or more integrated circuits for implementing the foregoing methods, for example, one or more application-specific integrated circuits (ASICs), one or more microprocessors (DSPs), or one or more field-programmable gate arrays (FPGAs). For another example, when one of the foregoing modules is implemented in a form of a processing element invoking program code, the processing element may be a general-purpose processor, for example, a central processing unit (CPU) or another processor such as a controller that may invoke the program code. For another example, these modules may be integrated together and implemented in a form of a system-on-a-chip (SOC).

All or a part of the foregoing embodiments may be implemented by software, hardware, firmware, a software module, or any combination thereof. When the software is used for implementation, all or a part of the foregoing embodiments may be implemented in a form of a computer program product. The computer program product includes one or more computer instructions. When the computer program instructions are loaded and executed on a computer, all or a part of the procedures or functions according to embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk drive, or a magnetic tape), an optical medium (for example, a DVD), a semiconductor medium (for example, a solid-state drive (SSD)), or the like.

The term "a plurality of" in this specification refers to two or more. The term "and/or" in this specification describes only an association relationship for describing associated objects and indicates that three relationships may exist. For example, A and/or B may indicate the following three cases: Only A exists, both A and B exist, and only B exists. In addition, a character "/" in this specification usually indicates an "or" relationship between associated objects, and a character "/" in a formula usually indicates a "division" relationship between associated objects. In addition, it should be understood that in descriptions of this application, terms such as "first" and "second" are merely used for distinguishing and description, but should not be understood as indicating or implying relative importance, or should not be understood as indicating or implying a sequence.

It may be understood that various numbers in embodiments of this application are merely used for differentiation for ease of description, and are not used to limit the scope of embodiments of this application.

It may be understood that sequence numbers of the foregoing processes do not mean execution sequences in embodiments of this application. The execution sequences of the processes should be determined based on functions and internal logic of the processes, and should not be construed as any limitation on the implementation processes of embodiments of this application.

What is claimed is:

1. An uninterruptible power supply, comprising a controller, a direct current-to-direct current circuit, a rectifier circuit, an inverter circuit, and a battery, wherein
an input end of the uninterruptible power supply is connected to an input end of the rectifier circuit, an output end of the rectifier circuit is connected to an input end of the inverter circuit, an output end of the inverter circuit is connected to an output end of the uninterruptible power supply, one end of the direct current-to-direct current circuit is connected to the output end of the rectifier circuit and the input end of the inverter circuit, and the other end of the direct current-to-direct current circuit is connected to the battery; and
the controller is configured to:
determine a target value of a state of charge (SOC) of the battery, wherein the target value is determined based on a first ratio of a load power of the uninterruptible power supply to a rated power of the uninterruptible power supply, and a second ratio of a target backup time of the uninterruptible power supply to a maximum backup time of the uninterruptible power supply, wherein the target backup time is a backup time corresponding to a load of the uninterruptible power supply; and
control, based on the target value, the rectifier circuit and the direct current-to-direct current circuit to charge the battery to make the SOC of the battery equal to the target value, or control, based on the target value, the inverter circuit and the direct current-to-direct current circuit to discharge the battery to make the SOC of the battery equal to the target value.

2. The uninterruptible power supply according to claim 1, wherein the controller is configured to:
   obtain a capacity of the battery, the target backup time, and the load power;
   determine the maximum backup time of the uninterruptible power supply based on the capacity of the battery and the load power; and
   determine the target value based on the maximum backup time of the uninterruptible power supply and the target backup time.

3. The uninterruptible power supply according to claim 1, wherein the controller is configured to:
   obtain a capacity of the battery, the target backup time, and the load power;
   determine, based on the load power and the target backup time, a storage energy of the battery; and
   determine the target value based on the storage energy and the capacity of the battery.

4. The uninterruptible power supply according to claim 1, wherein the controller is configured to:
   when the SOC of the battery is greater than the target value, control the inverter circuit and the direct current-to-direct current circuit to discharge the battery; or
   when the SOC of the battery is less than the target value, control the rectifier circuit and the direct current-to-direct current circuit to charge the battery.

5. The uninterruptible power supply according to claim 1, wherein the target value of the SOC is determined according to the following expression:

$$SOC_{target\ value} = K_1 * K_2 * 100\%$$

wherein $SOC_{target\ value}$ represents the target value of the SOC, $K_1$ represents the first ratio of the load power of the uninterruptible power supply to the rated power of the uninterruptible power supply, and $K_2$ represents the second ratio of the target backup time of the uninterruptible power supply to the maximum backup time of the uninterruptible power supply.

6. An uninterruptible power supply control method, comprising:
   determining a target value of a state of charge (SOC) of a battery of an uninterruptible power supply, wherein the target value is determined based on a first ratio of a load power of the uninterruptible power supply to a rated power of the uninterruptible power supply, and a second ratio of a target backup time of the uninterruptible power supply to a maximum backup time of the uninterruptible power supply, wherein the target backup time is a backup time corresponding to a load of the uninterruptible power supply; and
   controlling, based on the target value, a rectifier circuit and a direct current-to-direct current circuit of the uninterruptible power supply to charge the battery to make the SOC of the battery equal to the target value, or controlling, based on the target value, an inverter circuit and a direct current-to-direct current circuit of the uninterruptible power supply to discharge the battery to make the SOC of the battery equal to the target value.

7. The method according to claim 6, wherein the determining a target value of a SOC of a battery of an uninterruptible power supply comprises:
   obtaining a capacity of the battery, the target backup time, and the load power;
   determining the maximum backup time of the uninterruptible power supply based on the capacity of the battery and the load power; and
   determining the target value based on the maximum backup time of the uninterruptible power supply and the target backup time.

8. The method according to claim 6, wherein the determining a target value of a SOC of a battery of an uninterruptible power supply comprises:
   obtaining a capacity of the battery, the target backup time, and the load power;
   determining, based on the load power and the target backup time, storage energy of the battery; and
   determining the target value based on the storage energy and the capacity of the battery.

9. The method according to claim 6, wherein the controlling, based on the target value, a rectifier circuit and a direct current-to-direct current circuit of the uninterruptible power supply to charge the battery to make the SOC of the battery equal to the target value, or controlling, based on the target value, an inverter circuit and a direct current-to-direct current circuit of the uninterruptible power supply to discharge the battery to make the SOC of the battery equal to the target value comprises:
   when the SOC of the battery is greater than the target value, controlling the inverter circuit and the direct current-to-direct current circuit of the uninterruptible power supply to discharge the battery; or
   when the SOC of the battery is less than the target value, controlling the rectifier circuit and the direct current-to-direct current circuit of the uninterruptible power supply to charge the battery.

10. The method according to claim 6, wherein the target value of the SOC is determined according to the following expression:

$$SOC_{target\ value} = K_1 * K_2 * 100\%$$

wherein $SOC_{target\ value}$ represents the target value of the SOC, $K_1$ represents the first ratio of the load power of the uninterruptible power supply to the rated power of the uninterruptible power supply, and $K_2$ represents the second ratio of the target backup time of the uninterruptible power supply to the maximum backup time of the uninterruptible power supply.

* * * * *